United States Patent [19]

Merger et al.

[11] 4,191,838

[45] Mar. 4, 1980

[54] ACRYLOXY-ALKYLPROPANALS AND METHACRYLOXY-ALKYLPROPANALS

[75] Inventors: Franz Merger, Frankenthal; Friedrich Towae; Erich Penzel, both of Ludwigshafen, all of Fed. Rep. of Germany

[73] Assignee: BASF Aktiengesellschaft, Fed. Rep. of Germany

[21] Appl. No.: 901,422

[22] Filed: May 1, 1978

[30] Foreign Application Priority Data

May 16, 1977 [DE] Fed. Rep. of Germany ....... 2722097

[51] Int. Cl.$^2$ ............................................. C07C 69/54
[52] U.S. Cl. ................................... 560/205; 560/210; 260/602; 526/315
[58] Field of Search .................... 560/205, 210, 238

[56] References Cited

U.S. PATENT DOCUMENTS

| 2,638,479 | 5/1953 | Ballard et al. | 560/210 |
| 2,947,786 | 8/1960 | Brannock | 260/598 |
| 3,251,876 | 5/1966 | Morlock | 560/238 |
| 3,374,267 | 3/1968 | Tan | 560/238 |
| 3,673,258 | 6/1972 | Merger et al. | 260/602 |

FOREIGN PATENT DOCUMENTS 645956 2/1948 United Kingdom ..................... 560/238
1161095 8/1969 United Kingdom .

OTHER PUBLICATIONS

Hagemeyer, Hugh J. et al., "The Chemistry of Isobutyraldehyde and Its Derivatives." Tennessee Eastman Company, Publ. (1953).

*Primary Examiner*—Bernard Helfin
*Assistant Examiner*—L. Hendriksen
*Attorney, Agent, or Firm*—Keil & Witherspoon

[57] ABSTRACT

Acryloxy- and methacryloxy-alkyl-propanals and a process for their manufacture by esterifying the corresponding β-hydroxyalkylpropanals with acrylic acid and methacrylic acid, respectively, in the presence of an acid esterification catalyst and of an inert diluent.

5 Claims, No Drawings

ACRYLOXY-ALKYLPROPANALS AND METHACRYLOXY-ALKYLPROPANALS

Esters of alkanols and acrylic acid or methacrylic acid are manufactured industrially on a large scale by esterification-using an acid catalyst, e.g. a sulfonic acid or a mineral acid, for example sulfuric acid. Esters of this type can also be manufactured by trans-esterification using an acid or alkaline catalyst. If, however, a β-hydroxy-alkylpropanal is employed as the alcohol in the trans-esterification of an alkyl acrylate or alkyl methacrylate, the ester resinifies virtually completely under the conventional reaction conditions. Severe resinification is also observed if an attempt is made to esterify a β-hydroxy-propanal with acrylic acid or methacrylic acid in the presence of a sulfonic acid or of a mineral acid, under conventional reaction conditions.

We have now found that an acryloxy-alkylpropanol or methacryloxy-alkylpropanal of the general formula (1)

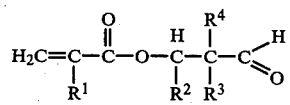

where $R^1$ is H or $CH_3$, $R^2$ is H or alkyl of 1 to 3 carbon atoms, $R^3$ is alkyl of 1 or 2 carbon atoms and $R^4$ is alkyl of 1 to 4 carbon atoms, may be obtained by reacting acrylic acid and methacrylic acid, respectively, with a β-hydroxy-alkylpropanal of the general formula (2)

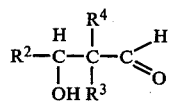

where $R^2$, $R^3$ and $R^4$ have the meanings given for the general formula (1), in the presence of an inert diluent and of a small amount of a sulfonic acid and a mineral acid, at an elevated temperature. Amongst suitable β-hydroxy-alkylpropanals, 2,2-dimethyl-3-hydroxypropanal, 2-hydroxymethyl-2-methylbutanal, 2-hydroxymethyl-2-methylpentanal, 2-ethyl-2-hydroxymethylhexanal and 3-hydroxy-2,2,4-trimethylpentanal are preferred. The acryloxy-alkylpropanals and methacryloxy-alkylpropanals of the general formula (1) are new compounds. To manufacture them by esterifying acrylic acid or methacrylic acid with a β-hydroxy-alkylpropanal (2), the acrylic acid or methacrylic acid is in general employed in an amount of from 1 to 5 moles (i.e. in an amount ranging from the equimolar amount to a 5-fold molar amount), preferably from 1.2 to 2 moles, per mole of the β-hydroxy-alkylpropanal. Examples of inert diluents which have proved suitable are liquid haloalkanes, especially chloroalkanes, with boiling points of from 40° C. to 190° C. Particular examples of such chloroalkanes are chloroform, ethylene chloride, trichloroethylene, carbon tetrachloride, methylene chloride, perchloroethylene and trifluorotrichloroethylene. Further suitable diluents are aliphatic ketones, e.g. methyl tert.-butyl ketone, 3-methylbutanone and 2,2'-dimethylpentan-2-one, and liquid aromatics, e.g. benzene, toluene, xylene and chlorobenzene, as well as saturated hydrocarbons, e.g. cyclohexane. The concentration of the hydroxy-alkylpropanal and of the acrylic acid or methacrylic acid in the inert diluent is in most cases from 15 to 90, especially from 30 to 70, % by weight. In carrying out the esterification, a small amount of a sulfonic acid and of a mineral acid is employed as the esterification catalyst. The amount of sulfonic acid is in most cases from 0.5 to 5, preferably from 1 to 3.5, mole %, based on the amount of the acrylic acid or methacrlic acid, whilst the amount of the mineral acid is in most cases from 0.1 to 3, preferably from 0.5 to 1.5, mole % based on the acrylic acid or methacrylic acid. Examples of suitable sulfonic acids are p-toluene-sulfonic acid, benzenesulfonic acid, ion exchangers containing sulfonic acid groups, methanesulfonic acid, naphthalenesulfonic acid and sulfophthalic acids; amongst the above, p-toluene-sulfonic acid and methanesulfonic acid are preferred. Suitable mineral acids are, in particular, sulfuric acid, hydrochloric acid, phosphoric acid and boric acid, sulfuric acid being preferred. The esterification is in general carried out at an elevated temperature, in particular at from 40° to 120° C., especially from 60° to 90° C.

Preferably, the water formed by the esterification is distilled off during the reaction. For example, the esterification reaction may be carried out by taking the inert solvent, containing the acid esterification catalyst, and adding the acrylic acid or methacrylic acid and the β-hydroxy-alkylpropanal from separate vessels, at an elevated temperature, at the rate at which they undergo esterification; the reactants may be added as a solution in an inert diluent. However, it is also possible to take an inert solvent which only contains a part of the acid esterification catalyst, for example the mineral acid, and to add the sulfonic acid simultaneously with the reactants, from separate reaction vessels, for example as a solution in an inert solvent. Finally, it is also possible to take a solution of the sulfonic acid in the inert solvent and to add the mineral acid simultaneously with the reactants, preferably from separate stock vessels, as a solution in an inert diluent. It is not necessary that sulfonic acid and mineral acid are present in the reaction mixture throughout the esterification reaction; rather, it is possible only to add one kind of acid esterification catalyst, for example the sulfonic acid, to the reaction mixture, which from the start contains the other kind of acid esterification catalyst, for example the mineral acid, when part of the reactants has already undergone esterification. However, in general it is advantageous to have both sulfonic acid and mineral acid present in the reaction mixture from the start.

The esterification is advantageously carried out in the presence of conventional stabilizers, i.e. polymerization inhibitors, the amount of which, based on the amount of acrylic acid or methacrylic acid, is in general from 0.1 to 3% by weight, preferably from 0.2 to 1% by weight. Suitable stabilizers are, in particular, p-hydroxyanisole and cresol as well as other (substituted) hydroxyanisoles and phenols, e.g. resorcinol and pyrocatechol, as well as copper salts, e.g. $CuCl_2$, $CuBr_2$, $CuSO_4$, $Cu(PO_3)_2$, $Cu(NO_3)_2$ and CuO.

At the end of the esterification reaction, the reaction mixture can be worked up by, for example, removing the diluent, neutralizing excess acid and purifying the residue under reduced pressure, for example on a thin film evaporator.

The acryloxy-alkylpropanals and methacryloxy-alkylpropanals of the general formula (1) are compounds which are liquid at room temperature and which, because of their great tendency to polymerize are preferably distilled in the presence of stabilizers under gentle conditions, e.g. under reduced pressure, using thin film evaporators. They can be stored in the absence of air and advantageously in the presence of a small amount of conventional stabilizers. They can be used, for example, as starting materials for synthesis in which reactions at the C-C double bond and/or at the aldehyde group are carried out. For example, these two groups can be hydrogenated catalytically, either together or separately, in the conventional manner.

The new acryloxy-alkylpropanals and methacryloxy-alkylpropanals of the general formula (1) are also valuable monomers from which homopolymers and copolymers containing carbonyl groups can be obtained. Their use as monomers for the manufacture of polymers has the advantage that they polymerize very much more easily than other monomers containing aldehyde groups, e.g. crotonaldehyde, and that their use, as compared to acrolein, causes very much less pollution of the environment. Their polymerization or copolymerization is preferably carried out in the presence of an inert diluent, especially of water or of an organic solvent, e.g. an alcohol, hydrocarbon or liquid aromatic, e.g. benzene, using a conventional polymerization initiator, for example hydrogen peroxide or a persulfate, e.g. ammonium persulfate or potassium persulfate, in an aqueous medium, or an organic peroxide, e.g. benzoyl peroxide, dicumyl peroxide, cymyl hydroperoxide or azo-bisnitriles, e.g. azo-bis-butyronitrile, in an organic medium, under the conventional conditions for emulsion, suspension or solution polymerization, for example at from room temperature to 100° C. Suitble comonomers for the manufacture of copolymers, which comonomers can be employed in amounts of from 1 to b 99.5, especially from 50 to 99.5, preferably from 80 to 99, % by weight based on the total amount of monomers, are, in particular, aromatic vinyl compounds, e.g. styrene, vinyl halides and/or vinylidene halides, in particular vinyl chloride and vinylidene chloride, monoolefinically unsaturated carboxylic acid esters, in most cases of 4 to 12 carbon atoms, for example vinyl esters and/or acrylate or methacrylate esters, e.g. vinyl acetate, vinyl propionate, vinyl n-butyrate, methyl acrylate, methyl methacrylate, ethyl acrylate, n-butyl acrylate, n-butyl methacrylate, isobutyl acrylate, 2-ethylhexyl acrylate, 2-ethylhexyl methacrylate and tert.-butyl methacrylate, $\alpha,\beta$-olefinically unsaturated carboxylic acid nitriles, especially acrylonitrile, $\alpha,\beta$-monoolefinically unsaturated monocarboxylic acids and/or dicarboxylic acids and/or their amides, which may or may not be substituted at the nitrogen, e.g. acrylic acid, methacrylic acid, acrylamide, methacrylamide, N-methylolmethacrylamide, N-n-butoxymethylacrylamide and N-acetoxymethacrylamide, and mixtures of monomers of the above type.

In the Examples which follow, parts are by weight.

EXAMPLE 1

432 parts of acrylic acid, 7 parts of p-toluenesulfonic acid, 1 part of copper-II chloride and 1.5 parts of hydroquinone monomethyl ether are dissolved in 1,000 parts of chloroform in a reaction vessel equipped with a reflux condenser and stirrer, and the solution is heated to the boil. A solution of 408 parts of hydroxypivalaldehyde in 1,000 parts of chloroform is added uniformly over 4 hours to the boiling solution. After this addition, 4 parts of 96% strength sulfuric acid are added and the water formed is distilled off azeotropically. After completion of the reaction, and after cooling, the reaction mixture is washed with dilute sodium bicarbonate solution and the chloroform is then distilled off under 0.5 mm Hg until the distillation temperature reaches 45° C. The residue is distilled in a thin film evaporator and 425 parts of acryloxypivalaldehyde (68% of theory), based on hydroxyaldehyde), of boiling point 48°–50° C./0.3 mm Hg are obtained. Analyses:

C found: 61.5 (calculated: 61.5)
H found: 8.3 (calculated: 7.8)
O found: 30.1 (calculated: 30.7).

EXAMPLE 2

320 parts of methacrylic acid, 4 parts of p-toluene-sulfonic acid, 1 parts of copper-II chloride and 1.6 parts of hydroquinone monomethyl ether are dissolved in 1,200 parts of chloroform in a reaction vessel equipped with a reflux condenser and stirrer, and the solution is heated to the boil. A solution of 344 parts of hydroxypivalaldehyde in 1,200 parts of chloroform is run into the boiling solution over 4 hours. After this addition, 4 parts of 96% strength sulfuric acid are added and the water formed during the reaction is distilled off azeotropically. After completion of the reaction, and after cooling, the reaction mixture is washed with dilute aqueous sodium bicarbonate solution. After distilling off the chloroform under reduced pressure until the boiling point reaches 45° C., the residue is distilled in a thin film evaporator at 95° C./0.4 mm Hg. 274 parts of methacryloxypivalaldehyde (48% of theory, based on hydroxyaldehyde) of boiling point 51°–56° C./0.3 mm Hg are obtained. Analyses:

C found: 62.0% (calculated: 64.5%)
H found: 9.2% (calculated: 9.8%)
O found: 25.9% (calculated: 25.8%).

EXAMPLE 3

108 parts of acrylic acid, 2 parts of p-toluenesulfonic acid, 1.5 parts of concentrated sulfuric acid, 0.3 part of copper-II chloride and 1 part of hydroquinone monomethyl ether are dissolved in 400 parts of ethylene chloride in a reaction vessel equipped with a reflux condenser and stirrer and the solution is heated to the boil. 144 parts of 3-hydroxy-2,2,4-trimethylpentanal are added in the course of 2 hours. After azeotropically distilling off the water of reaction, the procedure described in Example 1 is followed and 75 parts of 3-acryloxy-2,2,4-trimethylpentanal (38% of theory, based on the pentanal), boiling point 55°–58° C./0.2 Hg. are obtained.

EXAMPLE 4

34 parts of acrylic acid, 1 part of p-toluenesulfonic acid, 0.2 part of copper-II chloride and 0.3 part of hydroquinone monomethyl ether are dissolved in 150 parts of chloroform in a reaction vessel equipped with a reflux condenser and stirrer and the solution is heated to the boil. 65 parts of 2-hydroxymethyl-2-methylpentanal in 100 parts of chloroform are added in the course of 2 hours, followed by 0.7 part of concentrated sulfuric acid. After azeotropically distilling off the water of reaction, the procedure described in Example 1 is followed and 19 parts of 2-acryloxymethyl-2-methylpentanal (41% of theory, based on the pentanal), boiling point 57°–69° C./1.3 mm Hg are obtained.

USE EXAMPLE A

The following are added, starting at the same time, at 85° C., to a solution of 0.2 part of sodium paraffinsulfonate (the paraffin being of 15 carbon atoms) in 200 parts of water: (a) a mixture of 124 parts of water, 2.5 parts of sodium paraffinsulfonate (where the paraffin is of 15 carbon atoms), 300 parts of n-butyl acrylate, 20 parts of acrylonitrile, 5 parts of acrylic acid and 40 parts of acryloxypivalaldehyde, added over 2 hours and (b) a solution of 2 parts of potassium peroxydisulfate in 98 parts of water, in the course of 2½ hours. The mixture is allowed to react for a further 2 hours at 85° C. and is then cooled. An aqueous dispersion of an acryloxypivalaldehyde copolymer is obtained.

USE EXAMPLE B

The following are added simultaneously, at 85° C., to a solution of 15 parts of a 20% strength aqueous solution of isooctylphenol oxyethylated with 25 moles of ethylene oxide, in 200 parts of water: (a) 150 parts of vinyl acetate, 150 parts of vinyl propionate and 18.75 parts of acryloxypivalaldehyde, emulsified by means of 22.5 parts of a 20% strength aqueous solution of isooctylphenol, oxyethylated with 25 moles of ethylene oxide, in 170 parts of water, and (b) 1.5 parts of potassium persulfate in 60 parts of water. Both feeds are regulated so that the period of addition is 2.5 hours. The mixtue is then polymerized for a further 2.5 hours at 85° C. After cooling, an aqueous dispersion of a vinyl acetate/vinyl propionate copolymer is obtained.

We claim:

1. An acryloxy-alkylpropanal or methacryloxy-alkyl-propanal of the formula (1)

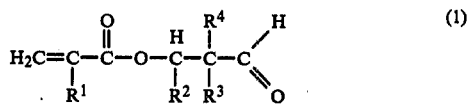

where $R^1$ is a substituent selected from —H and $CH_3$, $R^2$ is a substituent selected from —H and alkyl of 1 to 3 carbon atoms, $R^3$ is alkyl of 1 or 2 carbon atoms and $R^4$ is alkyl of 1 to 4 carbon atoms.

2. Acryloxypivalaldehyde.
3. Methacryloxypivalaldehyde.
4. 3-Acryloxy-2,2,4-trimethylpentanal.
5. 2-Acryloxymethyl-2-methylpentanal.

* * * * *